(12) United States Patent
Nagashima et al.

(10) Patent No.: US 6,509,422 B1
(45) Date of Patent: Jan. 21, 2003

(54) FLUORORESIN COMPOSITION

(75) Inventors: Masako Nagashima, Kawasaki; Takeshi Eriguchi, Yokohama; Yuriko Kaida, Yokohama; Hiroki Kamiya, Yokohama; Masao Umino; Masataka Yokota, both of Kasawaki, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/381,275

(22) PCT Filed: Jan. 18, 1999

(86) PCT No.: PCT/JP99/00130

§ 371 (c)(1),
(2), (4) Date: Sep. 20, 1999

(87) PCT Pub. No.: WO99/36473

PCT Pub. Date: Jul. 22, 1999

(30) Foreign Application Priority Data

Jan. 20, 1998 (JP) ............................................ 10-021563

(51) Int. Cl.⁷ ........................ C08F 283/04; C08G 69/48
(52) U.S. Cl. ...................... 525/422; 525/426; 525/535; 525/540; 528/310; 528/373; 528/401
(58) Field of Search ................................. 525/422, 426, 525/535, 540; 528/310, 373, 401

(56) References Cited

U.S. PATENT DOCUMENTS 4,433,104 A * 2/1984 Giles, Jr. ..................... 525/180
5,916,955 A * 6/1999 Kelly et al. .................. 524/497

FOREIGN PATENT DOCUMENTS

| EP | 0 728 776 A | 8/1996 |
| JP | 63-264672 | * 1/1988 |

* cited by examiner

*Primary Examiner*—Samuel A. Acquah
(74) *Attorney, Agent, or Firm*—Oblon, Spivak, McClelland, Maier & Neustadt, P.C.

(57) ABSTRACT

In 100 parts by weight of a composition, from 2 to 89 parts by weight of a fluorinated polymer having a fluorine content of at least 65 wt %, from 97 to 10 parts by weight of a non-fluorinated polymer and from 1 to 35 parts by weight of a dispersing agent having a carboxylic acid group or its derivative, or a sulfonic acid group or its derivative, are blended.

14 Claims, No Drawings

FLUORORESIN COMPOSITION

TECHNICAL FIELD

The present invention relates to a resin composition comprising a fluorinated polymer having a high fluorine content and a polymer containing no fluorine, which are uniformly and finely dispersed and mixed by a dispersing agent.

BACKGROUND ART

Heretofore, fluorinated polymers represented by a tetrafluoroethylene polymer, are excellent in heat resistance, flame retardant properties, chemical resistance, weather resistance, anti-sticking properties, low frictional properties and low dielectric properties, and used in a wide range of fields including, for example, a coating material for heat-resistant flame-retardant electrical wires, a corrosion-resistant piping material for chemical plants, a material for agricultural vinyl film houses, and a mold release coating material for kitchen equipment.

Such properties are derived from the three points of a strong C-F bond, a small polarizability and a weak intermolecular cohesion energy. Particularly, a low intermolecular cohesion energy makes the surface energy of the polymer low, whereby the affinity with another material, particularly with a polymer containing no fluorine, is low. Accordingly, a composition comprising a fluorinated polymer and a polymer containing no fluorine, one of which is uniformly and finely dispersed in the other polymer, can not be obtained.

To overcome this problem, the present inventors have proposed a composition comprising a fluorinated polymer, a non-fluorinated polymer, and as a dispersing agent, a grafted polymer obtained by reacting a fluorinated polymer having hydrogen atoms bonded to carbon atoms in its main chain, with a vinyl monomer having a functional group, while generating radicals, before (JP-A-9-118802).

This dispersing agent is effective for a fluorinated polymer having a low fluorine content, such as one having hydrogen atoms bonded to carbon atoms in its main chain in a certain proportion. However, there is a limitation for uniformly and finely dispersing a non-fluorinated polymer with a polymer having a high fluorine content, or with a polymer containing substantially no hydrogen atom bonded to carbon atoms in its main chain.

DISCLOSURE OF THE INVENTION

The present invention has been made to overcome the above-mentioned problems. The present inventors have found that a fluorine-containing resin composition comprising a polymer having a high fluorine content and a non-fluorinated polymer containing no fluorine, which are uniformly and finely dispersed and mixed, can be obtained, by using a fluorinated compound having, as a functional group, a carboxylic acid group or its derivative, or a sulfonic acid group or its derivative, in its molecule, as a dispersing agent to disperse and mix the polymers, and the present invention has been accomplished.

Namely, the present invention provides a fluorine-containing resin composition which comprises, in 100 parts by weight of the composition, from 2 to 89 parts by weight of a fluorinated polymer (a) which has a fluorine content of at least 65 wt % in its polymer molecule (hereinafter referred to as fluorinated polymer (a)), from 97 to 10 parts by weight of a polymer (b) containing no fluorine (hereinafter referred to as non-fluorinated polymer (b)), and from 1 to 35 parts by weight of a functional group-containing fluorinated compound (c) having, as a functional group, a carboxylic acid group or its derivative, or a sulfonic acid group or its derivative, in its molecule.

Here, the fluorinated polymer (a) has neither carboxylic acid group or its derivative, nor sulfonic acid group or its derivative, in its molecule, and it is different from the functional group-containing fluorinated compound (c).

The composition of the present invention has an island structure in which depending upon the amounts of the fluorinated polymer (a) and the non-fluorinated polymer (b) to be blended, the component with a smaller blending amount is dispersed in the other component. Accordingly, in the present invention, the component to be dispersed uniformly and finely, is not limited, and the structure of the composition may be such that the fluorinated polymer (a) is dispersed in the non-fluorinated polymer (b), or the structure may be such that the non-fluorinated polymer (b) is dispersed in the fluorinated polymer (a).

BEST MODE FOR CARRYING OUT THE INVENTION

As the fluorinated polymer (a) to be used in the present invention, a fluorinated polymer having a fluorine content of at least 65 wt % in its polymer molecule is used. Further, in view of heat resistance of the polymer, a polymer having a fluorine content of at least 70 wt % is preferably used.

As a preferred fluorinated polymer (a), a homopolymer of a fluoroolefin selected from tetrafluoroethylene (hereinafter referred to as TFE) and chlorotrifluoroethylene (hereinafter referred to as CTFE), or a copolymer of a fluoroolefin with a fluorinated monomer such as perfluoro(alkyl vinyl ether), hexafluoropropylene (hereinafter referred to as HFP), vinylidene fluoride or vinyl fluoride, may be used. Further, a copolymer of the above-mentioned fluoroolefin with an α-olefin containing no fluorine such as ethylene, propylene or butene, may be used, so long as the fluorine content in its polymer is at least 65 wt %.

As a specific example of such a fluorinated polymer, a TFE polymer (hereinafter referred to as PTFE), a CTFE polymer (hereinafter referred to as PCTFE), a TFE-HFP copolymer (hereinafter referred to as FEP), a TFE-perfluoro (alkyl vinyl ether) copolymer (hereinafter referred to as PFA), a TFE-ethylene copolymer (hereinafter referred to as ETFE), a CTFE-ethylene copolymer or a TFE-propylene copolymer may, for example, be mentioned. Preferred is PTFE, PCTFE, FEP or PFA, and particularly preferred is PFA, in view of heat resistance and chemical stability.

The non-fluorinated polymer (b) to be used in the present invention is a polymer containing no fluorine atom in its molecule.

The non-fluorinated polymer (b) is preferably a heat-resistant polymer capable of being melted and mixed with a fluorinated polymer having a high heat resistance. It is particularly preferably a polymer having a glass transition point (Tg) of at least 140° C. as an index of the heat resistance. As a specific example of the non-fluorinated polymer (b), an engineering plastic such as a polyamide (hereinafter referred to as PA), a polyamidoimide (hereinafter referred to as PAI), a polyetherimide (hereinafter referred to as PEI), a thermoplastic polyimide, a polycarbonate (hereinafter referred to as PC), a polysulfone (hereinafter referred to as PSF), a polyether sulfone (hereinafter referred to as PES), a polyether ether ketone (hereinafter referred to as PEEK), a polyallylate (hereinafter referred to as PAR), a modified PPO, a reinforced PET or a liquid crystal polymer (hereinafter referred to as LCP) may, for example, be mentioned. Among these, particularly preferred is PEI, PAI, a polybismaleimide, a thermoplastic polyimide or PES, and most preferred is PEI.

The contents of these fluorinated polymer (a) and non-fluorinated polymer (b) is such that in 100 parts by weight of the composition, the fluorinated polymer (a) is from 2 to 89 parts by weight, preferably from 10 to 44 parts by weight, and the non-fluorinated polymer (b) is from 97 to 10 parts by weight, preferably from 89 to 55 parts by weight.

In the present invention, as a dispersing agent, a functional group-containing fluorinated compound (c) having, as a functional group, a carboxylic acid group or its derivative, or a sulfonic acid group or its derivative, in its molecule (hereinafter referred to as dispersing agent (c)) is used. By using the dispersing agent (c), a composition having a structure in which the above-mentioned (a) and (b) are uniformly and finely dispersed, can be obtained. The composition of the present invention can not be obtained by simply blending (a) and (b). Such a dispersing agent can commonly be available as a surface active agent. Further, in view of the affinity with the fluorinated polymer (a), a compound containing fluorine is preferably used.

As a specific example of the dispersing agent (c) having, as a functional group, a carboxylic acid group or its derivative in its molecule, a perfluoroalkyl carboxylic acid such as $C_7F_{15}COOH$, $C_8F_{17}COOH$, $C_9F_{19}COOH$, $C_{10}F_{21}COOH$, $C_{11}F_{23}COOH$ or $C_{12}F_{25}COOH$, or its alkyl ester compound such as a methyl ester and an ethyl ester, its alkali metal salt or its ammonium salt, may, for example, be mentioned. Further, a polyfluoroalkyl carboxylic acid having some of fluorine atoms in the perfluoroalkyl group of the above-mentioned compound substituted by hydrogen atoms or other halogen atoms, or its derivative may, for example, be mentioned.

Further, as another specific example of the dispersing agent (c), a perfluoroalkyl ether carboxylic acid such as $C_3F_7OCF(CF_3)COOH$ and $C_3F_7OCF(CF_3)CF_2OCF(CF_3)COOH$, or its alkyl ester compound such as a methyl ester or an ethyl ester, its alkali metal salt or its ammonium salt, may, for example, be mentioned. Further, a polyfluoroalkyl carboxylic acid having some of fluorine atoms in the perfluoroalkyl group in the above-mentioned compound substituted by hydrogen atoms or other halogen atoms, or its derivative may, for example, be mentioned.

Still further, as another specific example of the dispersing agent (c), a perfluoroalkyl dicarboxylic acid such as $C_4F_8(COOH)_2$, $C_6F_{12}(COOH)_2$ or $C_8F_{16}(COOH)_2$, or its alkyl ester compound such as a methyl ester or an ethyl ester, its alkali metal salt or its ammonium salt, may, for example, be mentioned. Further, a polyfluoroalkyl carboxylic acid having some of fluorine atoms in the perfluoroalkyl group of the above-mentioned compound substituted by hydrogen atoms or other halogen atoms, or its derivative may, for example, be mentioned.

Further, as a specific example of the dispersing agent (c) having, as a functional group, a sulfonic acid group or its derivative in its molecule, a series of the above-mentioned compounds having the carboxylic acid group substituted by a sulfonic acid group, may be mentioned.

In the present invention, in view of dispersibility, the dispersing agent (c) is most preferably a fluorinated polymer containing polymer units based on an ethylene type monomer (hereinafter referred to as monomer (1)) having, as a functional group, at least one type of a carboxylic acid group or its derivative, or a sulfonic acid group or its derivative, in its molecule.

Here, in view of heat resistance, the monomer (1) having a carboxylic acid group or its derivative in its molecule is preferably a fluorinated monomer.

As a preferred specific example of the monomer (1) having a carboxylic acid group or its derivative in its molecule, a monomer having an ethylene type polymerizable functional group and a carboxylic acid group, such as $CF_2=CFOCF_2CF_2CF_2COOH$, $CF_2=CFOCF_2CF_2COOH$, $CF_2=CFOCF_2CF(CF_3)OCF_2CF_2COOH$ or $CH_2=CHCF_2CF_2CF_2COOH$, or its alkyl ester compound such as a methyl ester or an ethyl ester, its alkali metal salt or its ammonium salt, may, for example, be mentioned.

As a preferred specific example of the monomer (1) having, as a functional group, a sulfonic acid group or its derivative in its molecule, a monomer having an ethylene type polymerizable functional group and a sulfonic acid group, such as $CF_2=CFOCF_2CF_2CF_2SO_3H$, $CF_2=CFOCF_2CF_2SO_3H$, $CF_2=CFOCF_2CF(CF_3)OCF_2CF_2SO_3F$ or $CH_2=CHCF_2CF_2CF_2SO_3H$, or its alkyl ester compound such as a methyl ester or an ethyl ester, its alkali metal salt, its ammonium salt or its halide may, for example, be mentioned.

As a polymer of such a monomer (1), a homopolymer of the above-mentioned monomer (1), a copolymer of at least two types of the above-mentioned monomers (1) or a copolymer of the above-mentioned monomer (1) with an ethylene type monomer (hereinafter referred to as monomer (2)) copolymerizable with the above-mentioned monomer (1), may be used.

As the ethylene type monomer (2), an α-olefin such as ethylene or propylene, a vinyl ether or a vinyl ester may be mentioned. Preferred is an ethylene type fluorinated monomer having some or all hydrogen atoms in such a monomer substituted by fluorine atoms. As a preferred specific example of the monomer (2), TFE, CTFE, HFP or a perfluoro(alkyl vinyl ether) may, for example, be mentioned. The monomer (2) may be used alone or in combination as a mixture of two or more of them.

In the copolymer of the above-mentioned monomer (1) and monomer (2), the ratio of polymer units based on the monomer (1) is preferably from 3 to 30 mol %, more preferably from 3 to 15 mol %. If the ratio of the polymer units based on the monomer (1) is small, the effect as a dispersing agent is small, and if the ratio is large, the effect as a dispersing agent is also small.

The molecular weight of the polymer of the dispersing agent (c) is not particularly limited. However, it is preferably high within a range of not exceeding the molecular weight of the fluorinated polymer (a) to be used. If the molecular weight of the dispersing agent (c) is higher than the fluorinated polymer (a), melt-processing properties of the obtained composition may decrease, in some cases. Further, if the molecular weight of the dispersing agent (c) is extremely low, heat stability of the dispersing agent itself may decrease, whereby the dispersing effect can not be obtained, in some cases.

The polymer of the dispersing agent (c) can be produced by a common radical polymerization method. Further, as the polymerization type, an emulsion polymerization, a solution polymerization or a suspension polymerization may, for example, be employed.

The content of the dispersing agent (c) is from 1 to 35 parts by weight, preferably from 5 to 32 parts by weight, in 100 parts by weight of the composition. If the content of the dispersing agent (c) is less than 1 part by weight, the dispersibility of the mixture tends to be low, and if it exceeds 35 parts by weight, mechanical properties of the composition tends to deteriorate due to the dispersing agent (c), such being unfavorable.

The composition of the present invention can be produced by melt-mixing the components. It is preferred to mechanically knead the components at the temperature at which all the components are melted. The melt-mixing can be carried out by using e.g. a high temperature kneader or a screw extruder. Preferably, a twin-screw extruder is used, to carry out the mixing more vigorously.

The fluorine-containing resin composition of the present invention can be applied, as a molding material, to production of various molded products. In such a case, various types of fillers such as an inorganic powder, glass fibers, carbon fibers, a metal oxide and carbon, may be blended with the fluorine-containing resin composition of the present invention, within a range of not impairing the performances. Further, other than the fillers, optional additives such as a pigment, an ultraviolet absorber, a photostabilizer and an antioxidant, may be blended with the fluorine-containing resin composition of the present invention, depending upon the application.

By using the fluorine-containing resin composition of the present invention as a molding material, a molded product can be produced by a known molding method such as an injection molding, an extrusion molding, a co-extrusion molding, an inflation molding, coating or a transfer molding using a mold.

Further, the fluorine-containing resin composition of the present invention is uniformly and finely dispersed, and accordingly the obtained molded product is excellent in mechanical properties. Particularly, a composition of the fluorinated polymer (a) and the non-fluorinated polymer (b) which are uniformly and finely dispersed, having a high impact strength of the obtained molded product, can be obtained.

Now, the present invention will be described in further detail with reference to Examples and Comparative Examples. However, it should be understood that the present invention is by no means restricted to such specific Examples.

The content of polymer units in a resin in each Reference Example was obtained by measurements by NMR spectra.

Physical properties of a molded product of a fluorine-containing resin composition in each Example and Comparative Example, were measured by the following methods.
(1) Dispersed particle size The dispersed particle size was obtained by observation by a scanning electron microscope, followed by image processing, and represented as an average value of dispersed components.
(2) Izot impact strength The Izot impact strength was measured in accordance with ASTM D256.
(3) Tensile strength and tensile elongation The tensile strength and the tensile elongation were measured in accordance with ASTM D638.

REFERENCE EXAMPLE 1

Synthesis of a Carboxylate Group-containing Dispersing Agent (c)

A stainless autoclave with an internal volume of 2 l equipped with a stirrer was deaerated, 60 g of $CF_2$=$CFOCF_2CF_2CF_2COOCH_3$, 0.68 g of methanol and 1200 g of 1,3-dichloro-1,1,2,2,3-pentafluoropropane (hereinafter referred to as HCFC225cb) were put therein, the internal temperature was adjusted to 50° C., and 50 g of TFE was introduced therein so that the pressure was 2.8 kg/cm². 2 ml of a HCFC225cb solution containing 2.5 wt % of $(C_3F_7COO)_2$ as an initiator was injected therein, to initiate the polymerization. As the internal pressure would decrease with the progress of the polymerization reaction, TFE was continuously added thereto to keep a constant pressure. Further, the above-mentioned initiator was optionally added thereto during the polymerization, to continue the polymerization, and when the consumption of TFE reached 80 g, an unreacted monomer was discharged to terminate the reaction.

The polymer (hereinafter referred to as resin 1) obtained by washing and drying, was analyzed by F-NMR and H-NMR spectra, whereupon it contained 4.0 mol % of polymer units based on $CF_2$=$CFOCF_2CF_2CF_2COOCH_3$, and the volume flow rate was 370 mm³/sec as measured by a flow tester manufactured by Shimadzu Corp., with a die of 2.095 mmφ×8 mmL with a load of 7 kg at a temperature of 380° C.

REFERENCE EXAMPLE 2

Synthesis of a Carboxylate Group-containing Dispersing Agent (c)

A stainless autoclave with an internal volume of 500 ml equipped with a stirrer was deaerated, 288 g of deionized water, 8.2 g of $CF_2$=$CFOC_3F_7$, 49.5 g of $CF_2$=$CFOCF_2CF_2CF_2COOCH_3$, 0.7 g of perfluoroammonium nonanoate, and 0.24 g of ammonium persulfate as an initiator, were put therein, the internal temperature was adjusted to 55° C., and TFE was introduced therein so that the pressure was 12.8 kgf/cm³. As the internal pressure would decrease with the progress of the polymerization reaction, 37 g of TFE was continuously added thereto to keep a constant pressure, whereupon an unreacted monomer was discharged to terminate the reaction.

The polymer (hereinafter referred to as resin 2) obtained by washing and drying, was analyzed by F-NMR and H-NMR spectra, whereupon it contained 12.3 mol % of polymer units based on $CF_2$=$CFOCF_2CF_2CF_2COOCH_3$ and 2.3 mol % of units based on $CF_2$=$CFOC_3F_7$, and the volume flow rate was 251 mm³/sec as measured by a flow tester manufactured by Shimadzu Corp., with a die of 2.095 mmφ×8 mmL with a load of 7 kg at a temperature of 380° C.

REFERENCE EXAMPLE 3

Synthesis of a Sulfonyl Fluoride Group-containing Dispersing Agent (c)

286 g of HCFC225cb and 0.29 g of α,α'-azobisisobutylonitrile were charged in a stainless pressure-resistant reactor with an internal volume of 1000 ml, and 372 g of $CF_2$=$CFOCF_2C(CF_3)FOCF_2CF_2SO_3F$ and 78 g of $CF_2$=$CFOC_3F_7$ were charged therein. After an adequate deaeration, the temperature was raised to a polymerization temperature of 70° C., and the pressure was increased to a predetermined pressure of 12.2 kg/cm² by TFE, to carry out the reaction. The polymerization was carried out while introducing TFE, the pressure was kept to said predetermined pressure, and the reaction was terminated after 8 hours.

The polymer (hereinafter referred to as resin 3) obtained by washing and drying, was analyzed by F-NMR and H-NMR spectra, whereupon it contained 12.3 mol % of polymer units based on a monomer of $CF_2$=$CFOCF_2CF(CF_3)OCF_2CF_2SO_3F$ and 4.3 mol % of units based on $CF_2$=$CFOC_3F_7$, and the volume flow rate was 981 mm³/sec as measured by a flow tester manufactured by Shimadzu Corp., with a die of 2.095 mmφ×8 mmL with a load of 7 kg at a temperature of 380° C.

EXAMPLE 1

30Parts by weight of PFA (AFLON PFA P-63, manufactured by Asahi Glass Company Ltd., volume flow rate as measured under the same conditions as in Reference Examples: 17 mm³/sec) as the fluorinated polymer (a), 65 parts by weight of PEI (ULTEM 1000, manufactured by Nippon GE Plastic) as the non-fluorinated polymer (b) and 5 parts by weight of $C_3F_7OCF(CF_3)CF_2OCF(CF_3)COOH$ (hereinafter referred to as compound 1) as the dispersing agent (c) were mixed and extruded by the twin-screw extruder at 350° C., to prepare pellets. Further, a test specimen was prepared by an injection molding of the pellets at 370° C., whereupon various physical properties were measured. The results are shown in Table 1.

EXAMPLE 2

10 Parts by weight of PFA (AFLON PFA P-63, manufactured by Asahi Glass Company Ltd.) as the fluorinated polymer (a), 65 parts by weight of PEI (ULTEM 1000, manufactured by Nippon GE Plastic) as the non-fluorinated polymer (b) and 25 parts by weight of the resin 1 as the dispersing agent (c) were mixed and extruded by a twin-screw extruder at 350° C., to prepare pellets. Further, a test specimen was prepared by an injection molding of the pellets at 370° C., whereupon physical properties were measured in the same manner as in Example 1. The results are shown in Table 1.

EXAMPLES 3 to 8

PFA (AFLON PFA P-63, manufactured by Asahi Glass Company Ltd.) as the fluorinated polymer (a), PEI (ULTEM 1000, manufactured by Nippon GE Plastic) as the non-fluorinated polymer (b) and the resin 2 as the dispersing agent (c) with respective weight ratio, were mixed and extruded by a twin-screw extruder at 350° C. to prepare pellets. Further, a test specimen was prepared by an injection molding of the pellets at 370° C., whereupon physical properties were measured in the same manner as in Example 1. The results are shown in Table 1.

EXAMPLE 9

Parts by weight of PFA (AFLON PFA P-63, manufactured by Asahi Glass Company Ltd.) as the fluorinated polymer (a), 65 parts by weight of PEI (ULTEM 1000, manufactured by Nippon GE Plastic) as the non-fluorinated polymer (b) and 25 parts by weight of the resin 3 as the dispersing agent (c) were mixed and extruded by a twin-screw extruder at 350° C., to prepare pellets. Further, a test specimen was prepared by an injection molding of the pellets at 370° C., whereupon physical properties were measured in the same manner as in Example 1. The results are shown in Table 1.

EXAMPLE 10 (COMPARATIVE EXAMPLE)

Pellets were prepared by a twin-screw extruder in the same manner as in Examples, except that 35 parts by weight of PFA (AFLON PFA P-63, manufactured by Asahi Glass Company Ltd.) as the fluorinated polymer (a) and 65 parts by weight of PEI (ULTEM 1000, manufactured by Nippon GE Plastic) as the non-fluorinated polymer (b) alone were used, and the dispersing agent (c) was not blended therewith. A test specimen was prepared by an injection molding, whereupon physical properties were measured in the same manner as in Example 1. The results are shown in Table 1.

When the dispersing agent (c) was not used, the dispersed particle size in the blend composition tended to be large, mechanical properties of the obtained molded product tended to be low, and particularly, the Izot impact strength tended to be low.

TABLE 1

| Composition ratio (parts by weight) | Ex. 1 | Ex. 2 | Ex. 3 | Ex. 4 | Ex. 5 | Ex. 6 | Ex. 7 | Ex. 8 | Ex. 9 | Ex.10 |
|---|---|---|---|---|---|---|---|---|---|---|
| Fluorinated polymer (a) | 30 | 10 | 17.5 | 15 | 12.5 | 10 | 5 | 3 | 10 | 35 |
| Non-fluorinated polymer (b) | 65 | 65 | 65 | 65 | 65 | 65 | 65 | 65 | 65 | 65 |
| Dispersing agent (c) | | | | | | | | | | |
| Compound 1 | 5 | — | — | — | — | — | — | — | — | — |
| Resin 1 (Ref. Ex. 1) | — | 25 | — | — | — | — | — | — | — | — |
| Resin 2 (Ref. Ex. 2) | — | — | 17.5 | 20 | 22.5 | 25 | 30 | 32 | — | — |
| Resin 3 (Ref. Ex. 3) | — | — | — | — | — | — | — | — | 25 | — |
| Properties | | | | | | | | | | |
| Dispersed particle size ($\mu$m) | 4.8 | 2.0 | 0.8 | 1.1 | 1.3 | 1.5 | 2.2 | 2.8 | 1.1 | 5.6 |
| Tensile strength (MPa) | 68.1 | 71.8 | 72.4 | 78.8 | 73.6 | 70.6 | 70.3 | 75.4 | 69.9 | 53.1 |
| Tensile elongation (%) | 3.2 | 5.9 | 12.0 | 9.6 | 7.5 | 6.0 | 5.3 | 5.3 | 6.0 | 3.1 |
| Izot impact strength (notched) (KJ/m) | 20.2 | 21.2 | 20.7 | 25.3 | 26.9 | 22.1 | 12.7 | 8.4 | 20.4 | 4.5 |
| Izot impact strength (unnotched) (KJ/m) | 59.7 | 88.4 | Survival | Survival | 151.3 | 127.4 | 72.7 | 39.9 | 93.7 | 20.0 |

INDUSTRIAL APPLICABILITY

The fluorine-containing resin composition of the present invention is a material having performances as a fluorinated polymer and performances as a non-fluorinated polymer simultaneously, and is excellent in mechanical strength and elongation of the obtained molded product. The fluorine-containing resin composition of the present invention can be used in a wide range of fields including, for example, a sealing material and a bearing material.

What is claimed is:

1. A fluorine-containing resin composition which comprises in 100 parts by weight of the composition, from 2 to 89 parts by weight of a fluorinated polymer (a) which has a fluorine content of at least 65 wt %, from 97 to 10 parts by weight of a polymer (b) containing no fluorine, and from 1 to 35 parts by weight of a functional group-containing fluorinated polymer (c) containing polymer units based on an ethylene type monomer having a sulfonic acid group or a derivative of a sulfonic acid group.

2. The fluorine-containing resin composition according to claim 1, wherein said fluorinated polymer (a) is a homopolymer of a fluoroolefin selected from the group consisting of tetrafluoroethylene and chlorotrifluoroethylene, a copolymer of a fluoroolefin with a perfluoro(alkyl vinyl ether), or a copolymer of a fluoroolefin with hexafluoropropylene.

3. The fluorine-containing resin composition according to claim 1, wherein said fluorinated polymer (a) is a copolymer of tetrafluoroethylene with a perfluoro(alkyl vinyl ether).

4. The fluorine-containing resin composition according to claim 1, wherein said polymer (b) containing no fluorine is selected from the group consisting of a polyetherimide, a polyamidoimide, a polybismaleimide, a thermoplastic polyimide and a polyether sulfone.

5. The fluorine-containing resin composition according to claim 1, wherein said functional group-containing fluorinated polymer (c) is a functional group-containing fluorinated polymer comprising polymerized units of an ethylene type monomer having a sulfonic acid group or a derivative of a sulfonic acid group, in its molecule, and polymerized units of an ethylene type fluorinated monomer.

6. A fluorine-containing resin composition which comprises, in 100 parts by weight of the composition, from 10 to 44 parts by weight of a copolymer (a') of tetrafluoroethylene with a perfluoro(alkyl vinyl ether), from 55 to 89 parts by weight of a polyetherimide (b'), and from 1 to 35 parts by weight of a functional group-containing fluorinated polymer (c) comprising polymerized units of an ethylene type monomer having at least one sulfonic acid group or a derivative of a sulfonic acid group, in its molecule.

7. The fluorine-containing resin composition of claim 1, wherein the polymer (c) comprises polyermized units of a monomer selected from the group consisting of $CF_2$=CFOCF$_2$CF$_2$CF$_2$SO$_3$H, $CF_2$=CFOCF$_2$CF$_2$SO$_3$H, $CF_2$–CFOCF$_2$CF(CF$_3$)OCF$_2$CF$_2$SO$_3$F and $CH_2$=CHCF$_2$CF$_2$CF$_2$SO$_3$H.

8. The fluorine-containing resin composition as of claim 7, wherein the polymer (c) is a homopolymer.

9. The fluorine-containing resin composition of claim 7, wherein the polymer (c) is a copolymer with an α-olefin.

10. The fluorine-containing resin composition of claim 9, wherein the polymer (c) comprises from 3 to 30 mol% of polymerized units of the solfonic acid group-containing monomer.

11. The fluorine-containing resin composition of claim 1, wherein the composition comprises from 5 to 32 parts by weight of the polymer (c) based on 100 parts by weight of the composition.

12. The fluorine-containing resin composition of claim 1, further comprising at least one filler selected from the group consisting of an inorganic powder, a glass fiber, a carbon fiber, a metal oxide and carbon.

13. The fluorine-containing resin composition of claim 1, wherein the polymer (c) comprises polymerized units of $CF_2$=CFOC$_3$F$_7$ and $CF_2$=CFOCF$_2$C(CF$_3$)FOCF$_2$CF$_2$SO$_3$F.

14. The fluorine-containing resin composition of claim 1, comprising 10 parts by weight of the polymer (a), 65 parts by weight of the polymer (b) and 25 parts by weight of the polymer (c).

* * * * *